US010587648B2

(12) United States Patent
Koster et al.

(10) Patent No.: US 10,587,648 B2
(45) Date of Patent: *Mar. 10, 2020

(54) RECURSIVE DOMAIN NAME SERVICE (DNS) PREFETCHING

(71) Applicant: International Business Machines Corporation, Armonk, NY (US)

(72) Inventors: David M. Koster, Rochester, MN (US); Jason A. Nikolai, Rochester, MN (US); Adam D. Reznechek, Rochester, MN (US); Andrew T. Thorstensen, Morrisville, NC (US)

(73) Assignee: International Business Machines Corporation, Armonk, NY (US)

(*) Notice: Subject to any disclaimer, the term of this patent is extended or adjusted under 35 U.S.C. 154(b) by 203 days.

This patent is subject to a terminal disclaimer.

(21) Appl. No.: 15/487,176

(22) Filed: Apr. 13, 2017

(65) Prior Publication Data

US 2018/0302433 A1    Oct. 18, 2018

(51) Int. Cl.
| | |
|---|---|
| H04L 29/06 | (2006.01) |
| H04L 29/12 | (2006.01) |
| H04L 29/08 | (2006.01) |
| H04L 12/26 | (2006.01) |

(52) U.S. Cl.
CPC ...... *H04L 63/1458* (2013.01); *H04L 43/0876* (2013.01); *H04L 61/1511* (2013.01); *H04L 63/1416* (2013.01); *H04L 67/2847* (2013.01); *H04L 61/6009* (2013.01)

(58) Field of Classification Search
CPC ............. H04L 63/1458; H04L 63/1416; H04L 63/0876; H04L 67/2847; H04L 61/1511; H04L 61/6009; H04L 43/0876
See application file for complete search history.

(56) References Cited

U.S. PATENT DOCUMENTS

| | | | |
|---|---|---|---|
| 7,849,502 B1* | 12/2010 | Bloch | H04L 29/12066 726/11 |
| 8,606,926 B2 | 12/2013 | Ulevitch | |
| 8,631,489 B2 | 1/2014 | Antonakakis et al. | |
| 8,645,501 B2 | 2/2014 | Ghosh et al. | |
| 8,713,188 B2 | 4/2014 | Treuhaft | |
| 9,225,794 B2 | 12/2015 | Roskind | |
| 2003/0163722 A1* | 8/2003 | Anderson, IV | H04L 29/12216 726/3 |
| 2010/0146415 A1 | 6/2010 | Lepeska | |
| 2014/0172944 A1* | 6/2014 | Newton | H04L 41/0893 709/202 |

(Continued)

FOREIGN PATENT DOCUMENTS

| | | |
|---|---|---|
| EP | 2557759 A1 | 2/2013 |
| WO | 2010027794 A1 | 3/2010 |
| WO | 2015169094 A1 | 11/2015 |

OTHER PUBLICATIONS

List of IBM Patents or Patent Applications Treated as Related.

(Continued)

*Primary Examiner* — Joseph P Hirl
*Assistant Examiner* — Chi D Nguy
(74) *Attorney, Agent, or Firm* — Middleton Reutlinger

(57) ABSTRACT

A method, apparatus and program product utilize Domain Name Service (DNS) prefetching in a recursive DNS server, e.g., to mitigate Distributed Denial of Service (DDoS) attacks on a DNS service.

16 Claims, 6 Drawing Sheets

(56) References Cited

U.S. PATENT DOCUMENTS

| | | | |
|---|---|---|---|
| 2014/0344925 A1* | 11/2014 | Muthiah | H04L 61/1511 726/22 |
| 2015/0026341 A1 | 1/2015 | Blacka et al. | |
| 2016/0026341 A1 | 1/2016 | Kraev | |
| 2016/0028847 A1 | 1/2016 | Bradshaw et al. | |
| 2016/0099964 A1 | 4/2016 | Htay et al. | |
| 2016/0164825 A1 | 6/2016 | Riedel et al. | |
| 2016/0234249 A1 | 8/2016 | Wong | |
| 2016/0373405 A1* | 12/2016 | Miller | H04L 63/0236 |
| 2017/0126616 A1* | 5/2017 | Halley | H04L 61/1511 |
| 2018/0183830 A1* | 6/2018 | Wessels | H04L 63/1458 |

OTHER PUBLICATIONS

Dodopoulos et al.; "DNS-based Detection of Malicious Activity", Eindhover University of Technology, Master Thesis, Nov. 2015, pp. 1-74.

Gao et al.; "Reexamining DNS From a Global Recursive Resolver Perspecitive", IEEE/ACM Transactions on Networking, vol. 24, Iss. 1, Oct. 21, 2014, pp. 43-57.

Perdisci et al.; "WSEC DNS: Protecting Recursive DNS Resolvers From Positioning Attacks", DSN'09 IEEE/IFIP International Conference On, Jun. 29-Jul. 2, 2009, pp. 3-12.

Google Groups Chromium-discuss group, https://groups.google.com/a/chromium.org/forum/#!topic/chromium-discuss/PENrhsetsoo, Mar. 31, 2010.

"Recursion with the Authoritative Server", PowerDNS, https://doc.powerdns.com/md/authoritative/recursion/.

Frost, Chris, "What is the Difference between Authoritative and Recursive DNS Nameservers?" http://blog.opendns.com/2014/07/16/difference-authoritative-recursive-dns-nameservers/; Jul. 16, 2014.

* cited by examiner

RECURSIVE DOMAIN NAME SERVICE (DNS) PREFETCHING

BACKGROUND

Computers and computer networks are routinely subjected to increasingly-complex and problematic cyber-attacks from malicious actors. Denial-of-service (DoS) attacks, for example, attempt to disrupt the operation of a computer or other network resource by overwhelming the computer or network resource with superfluous requests and thereby attempt to prevent legitimate requests from being handled. One type of DoS attack is a distributed denial-of-service (DDoS) attack, which relies on numerous networked computers (which are often compromised and participate in an attack without the knowledge of their owners) to issue superfluous requests from numerous sender addresses. Because the superfluous requests do not originate from the same sender address, a DDoS attack is generally more difficult to counter than a DoS attack originating from one machine, as the latter of which generally can be countered by blocking all network traffic from that single machine and continuing to handle traffic from other, presumably legitimate, machines.

Some DDoS attacks are directed against the Domain Name Service (DNS), which is a distributed directory service that maps computers and other network resources to specific addresses and enables such resources to be accessed via domain names rather than the specific addresses associated with those resources. Domain names generally take the form of strings of alphanumeric characters separated by periods, e.g., "us.ibm.com," with the string "com" referring to a top level domain, the string "ibm" referring to a domain, and the string "us" referring to a sub-domain of the "ibm" domain. DNS systems generally handle DNS requests by returning either DNS entries corresponding to requested domain names or invalid responses that occur whenever a lookup of a requested domain name fails to locate a matching DNS entry.

DNS systems may be both hierarchical and decentralized in nature such that individual DNS servers will either respond to a DNS request by returning a DNS entry that matches the request if such a match can be found, or by passing the request on to a higher order DNS server to attempt to find a matching DNS entry. Higher order DNS servers may be designated root and/or authoritative DNS servers, with root DNS servers handling top level domains such as "com," "edu," "gov," etc., and with authoritative DNS servers generally handling all of the sub-domains for one or more particular domains. Authoritative DNS servers are tasked with maintaining an accurate set of mappings for all of the sub-domains of their respective domains, such that whenever an authoritative DNS server is unable to find a matching DNS entry for a particular DNS request, the fact that no such entry exists can be assumed. Lower level DNS servers, in contrast, may be referred to as recursive DNS servers, as these DNS servers generally maintain a cache of DNS entries from authoritative DNS servers, and whenever those DNS servers are unable to service a DNS request, they pass the DNS request along to a higher order server for processing.

The hierarchical nature of a DNS system, however, has been exploited by some DDoS attacks to overwhelm authoritative DNS servers. With such attacks, generally several attack machines issue DNS requests for numerous random non-existent sub-domains for a particular domain. The requests are then passed up through the DNS hierarchy from DNS server to DNS server until an authoritative DNS server is reached, at which point the request is rejected and an invalid response is returned back through the hierarchy to the requesting machine. Since the recursive DNS servers in the hierarchy cache only valid DNS entries, these malicious DNS requests for random sub-domains will generate network traffic for the multiple requests and responses passed through the hierarchy, and ultimately overwhelm or even crash the authoritative DNS server that ultimately handles all of the malicious DNS requests.

Therefore, a continuing need exists for a manner of addressing DoS attacks to a DNS system.

SUMMARY

According to an embodiment of the present invention, an apparatus, a program product, and a method of handling Domain Name Service (DNS) requests may include prefetching from an authoritative DNS server DNS entries for one or more domains to build a whitelist in a recursive DNS server, and in response to a DNS request received by the recursive DNS server, accessing the whitelist to attempt to locate a matching DNS entry for the received DNS request and in response to locating a matching DNS entry for the received DNS request, returning the matching DNS entry as a response to the DNS request.

In some embodiments, the whitelist is a semi-authoritative whitelist. In addition, some embodiments may further include monitoring system load, where accessing the whitelist is selectively performed in response to the monitored system load. Also, in some embodiments, monitoring system load includes monitoring system load in the recursive DNS server.

Further, in some embodiments, monitoring system load includes monitoring response time for the authoritative DNS server. In addition, some embodiments may further include activating a mode in response to determining a high system load from the monitored system load, where accessing the whitelist is only performed when the mode is activated when the DNS request is received by the recursive DNS server, and after activating the mode, selectively deactivating the mode in response to determining a discontinuation of the high system load from the monitored system load.

Some embodiments may also include caching failed DNS requests in a negative feedback cache, and in response to the DNS request received by the recursive DNS server, accessing the negative feedback cache and returning an invalid DNS response in response to the DNS request received by the recursive DNS server matching a failed DNS request cached in the negative feedback cache.

In addition, in some embodiments, accessing the whitelist is performed in response to the DNS request received by the recursive DNS server not matching any failed DNS request cached in the negative feedback cache. Some embodiments may also include removing stale failed DNS requests from the negative feedback cache.

In some embodiments, caching the failed DNS requests includes associating each failed DNS request with a timeout, where removing stale failed DNS requests includes removing failed DNS requests for which the associated timeout has been triggered. Some embodiments may also include in response to not locating the matching DNS entry for the received DNS request, forwarding the DNS request received by the recursive DNS server to a different DNS server, and in response to receiving an invalid response to the forwarded DNS request from the different DNS server, caching the DNS request received by the recursive DNS server in the negative feedback cache as a failed DNS request.

In addition, some embodiments may also include activating a mode in response to determining a high system load, where accessing the negative feedback cache is only performed when the mode is activated when the DNS request is received by the recursive DNS server, and after activating the mode, selectively deactivating the mode in response to determining a discontinuation of the high system load from the monitored system load.

In addition, some embodiments may further include applying a malicious query matching filter to the DNS request received by the recursive DNS server, and returning an invalid DNS response to the DNS request received by the recursive DNS server in response to a match with the malicious query matching filter. In some embodiments, the malicious query matching filter includes a bloom filter.

Further, in some embodiments, prefetching from the authoritative DNS server the DNS entries for the one or more domains includes prefetching from the authoritative DNS server each sub-domain for the one or more domains. Some embodiments may further include updating the whitelist over time by repeating prefetching from the authoritative DNS server, and in some embodiments, the recursive DNS server is resident in a root DNS data processing system, an Internet Service Provider (ISP) data processing system, a network router data processing system or a client data processing system.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

In various embodiments consistent with the invention, and as will become more apparent below, DNS prefetching may be implemented in a recursive DNS server to build a semi-authoritative whitelist in the recursive DNS server and thereby reduce network traffic to and/or system load of higher level DNS servers such as authoritative DNS servers, e.g., as might otherwise occur in connection with denial-of-service DNS attacks. Further, as will also become more apparent below, in some embodiments prefetching may also be combined with negative feedback caching to further assist within addressing potential denial-of-service DNS attacks, and in some embodiments, one or both of DNS prefetching and negative feedback caching may be selectively and dynamically activated based upon the system load of a recursive and/or authoritative DNS server.

Figure 1:
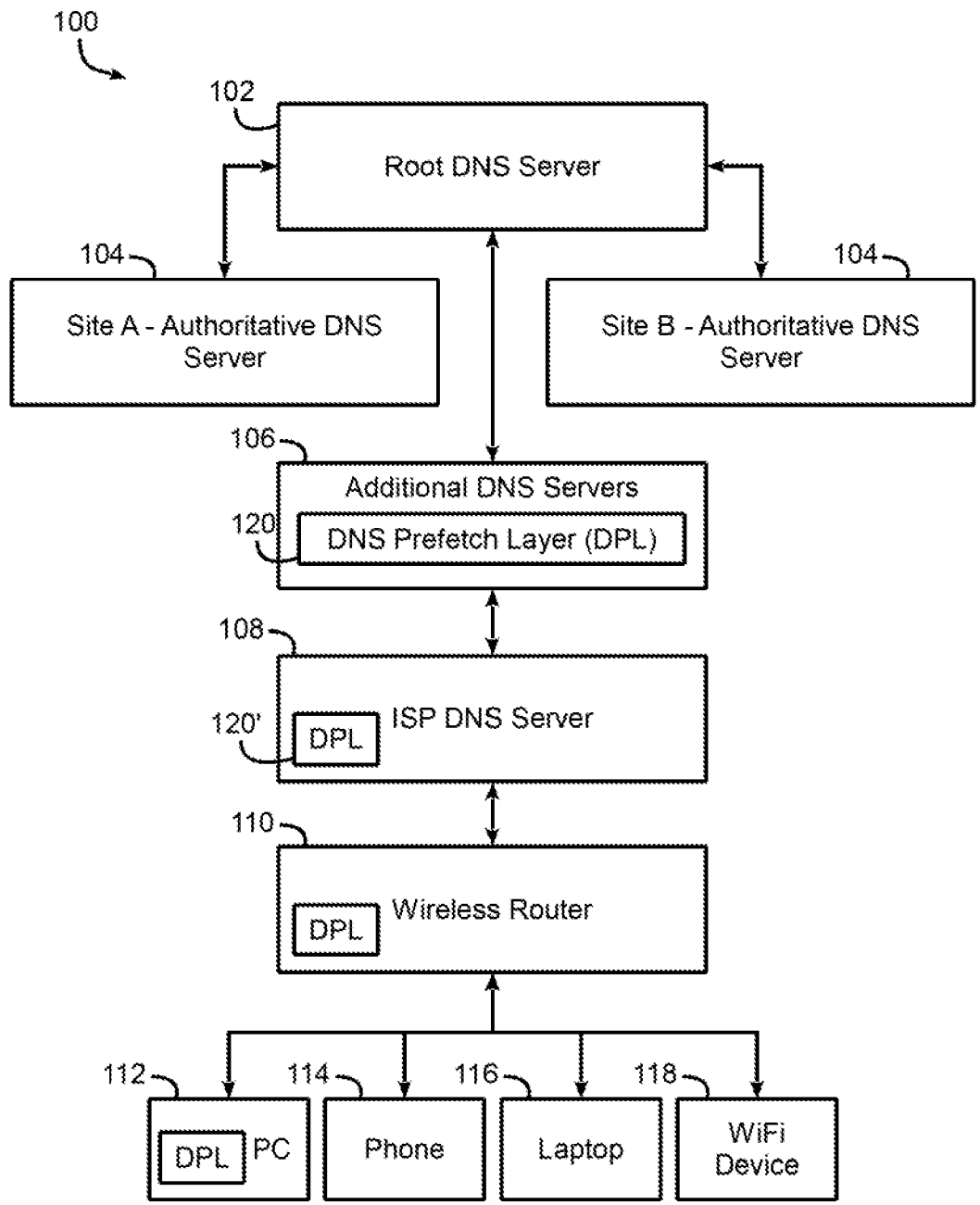
FIG. 1 is a block diagram of an example DNS system including a DNS prefetch layer consistent with the invention.

Referring now to the Drawings, wherein like numbers denote like parts throughout the several views, FIG. 1 illustrates an example DNS system 100 including a hierarchical arrangement of DNS servers, e.g., as may be used for the Internet. One or more root DNS servers 102 provide Top Level Domain (TLD) DNS lookup, while one or more authoritative DNS servers 104 provide DNS lookup for particular domains, e.g., for particular web sites such as sites A and B illustrated in FIG. 1.

Below the root and authoritative DNS servers 102, 104 are one or more additional DNS servers 106, which in turn are accessible by various Internet Service Provider (ISP) DNS servers 108. Furthermore, as illustrated at block 110, a wireless router or other networking device may interface various client devices, e.g., desktop or personal computers (PC's) 112, smart phones 114, laptops, 116, wireless devices 118, etc., with various higher level DNS servers.

In general, an authoritative DNS server 104 will maintain an authoritative list of active sub-domains for any domains managed thereby, and a root DNS server 102 is generally accessed in order to locate the appropriate authoritative DNS server 104 so that the authoritative DNS server 104 can be accessed to perform a DNS lookup for a particular domain. Other DNS servers, whether implemented as additional DNS servers 106, ISP DNS servers 108, or within individual network or computing devices, may generally be considered to be "recursive" DNS servers insofar as such DNS servers generally do not act as authoritative sources for DNS entries, but do maintain caches of DNS entries retrieved from authoritative DNS servers such that whenever a DNS request is received by such a DNS server, the DNS server will either return a cached DNS entry if available, or recursively issue a DNS request to a higher level DNS server to attempt to locate the appropriate DNS entry. Thus, a single DNS request may, in some instances, be recursively propagated up through the DNS hierarchy until an authoritative DNS server can either return the confirmed DNS entry or verify that the DNS request is invalid. Moreover, as valid DNS entries are returned from higher order DNS servers, those entries are generally cached by lower order DNS servers so that subsequent requests for the same DNS entries can be serviced locally from the cached copies.

A recursive DNS server, within the context of the disclosure, may be considered to be a DNS server that is capable of servicing DNS requests, but that otherwise is not authoritative at least with respect to a particular domain, such that DNS requests for that particular domain are referred to another DNS server via a recursive DNS request when the recursive DNS server does not have a cached DNS entry therefor. Further, for the purposes of this disclosure, a recursive DNS server may in some instances be considered to be implemented as part of a multi-user DNS service, e.g., as with the case of ISP DNS server 108, additional DNS server 106, and in some instances authoritative DNS server 104 and/or root DNS server 102 (if either of these servers is non-authoritative for a particular domain), as these devices are implemented within a private and/or public local and/or wide area network. In addition, a recursive DNS server in other instances may be considered to be implemented as part of a single-user or local area DNS service, e.g., as is the case with a router or network device 110.

Figure 2A:
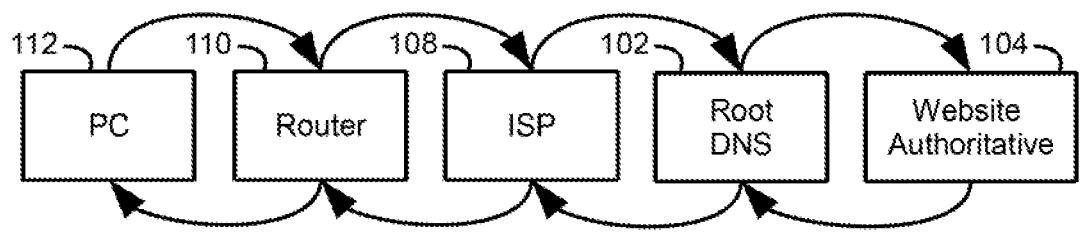
FIGS. 2A-2D are block diagrams illustrating DNS request handling in various scenarios in the DNS system of FIG. 1.
Figure 2B:
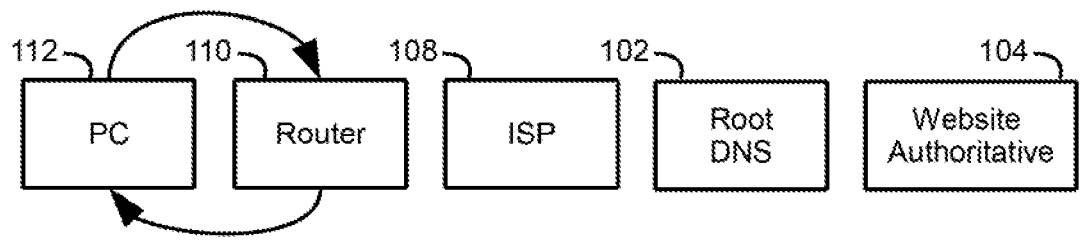
Figure 2C:
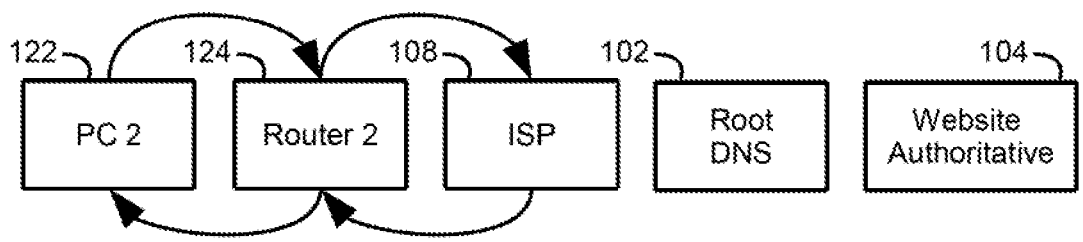

As an illustration of the aforementioned operations, FIG. 2A illustrates the issuance of a DNS request by a computer (PC) 112 to a network device such as router 110. Assuming for the purposes of this example that the DNS entry is not cached by an DNS server, the request propagates up from the DNS server in router 110, then to the ISP DNS server 108, and then to the root DNS server 102 for the top level domain. The root DNS server 102 identifies the authoritative DNS server 104 for the domain associated with the DNS request, and forwards the request onto that authoritative DNS server 104. Assuming the request is valid, the DNS entry is then returned through DNS servers in devices 102, 108 and 110 and back to computer 112, and is cached in each of these devices. Thus, as illustrated in FIG. 2B, if the same computer 112 makes another DNS request to the same domain, and the DNS entry is cached in the router 110, the router 110 returns its cached copy of the DNS entry to the computer in response to the request. Further, as illustrated in FIG. 2C, since DNS entries may be cached in DNS servers that are used by multiple users, a subsequent DNS request for the same DNS entry made by a different computer (PC2) 122 for a customer of the same ISP, the DNS request will be serviced by the ISP DNS server 108 by returning its cached copy of the DNS entry back to computer 122 through that user's router (router 2) 124.

Figure 2D:
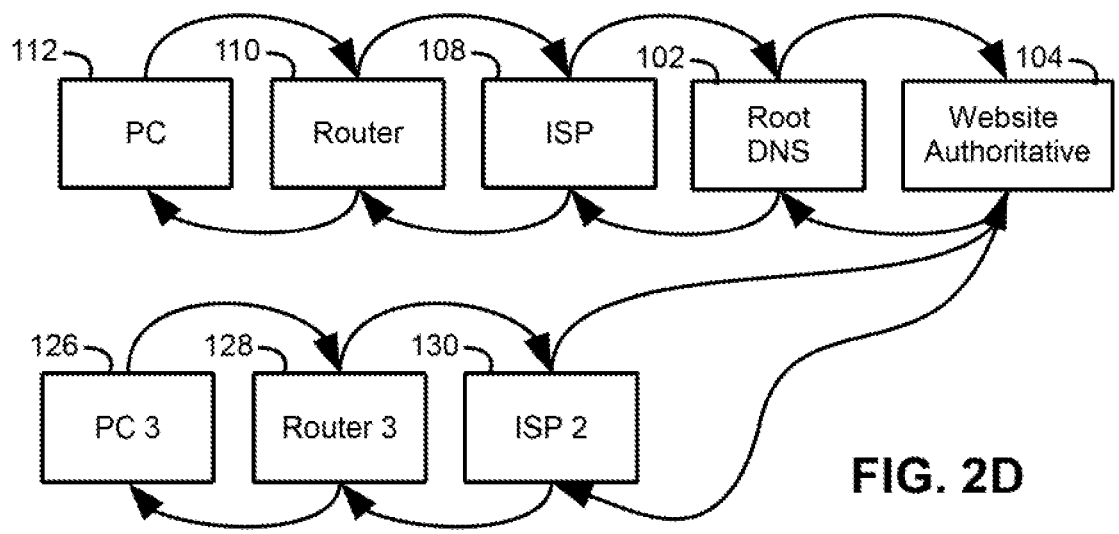

DNS-based DDoS attacks, as also noted above, generally incorporate the issuance by multiple compromised machines of numerous malicious DNS requests for random non-existent sub-domains (e.g., abcdef.ibm.com) for a particular domain. Because the DNS requests are for non-existent sub-domains, and are issued by multiple sources, the responsible authoritative DNS server may become overwhelmed servicing the requests from all of these sources, as the corresponding DNS entries will not exist and will therefore not be cached anywhere within the DNS hierarchy, resulting in all requests being propagated up through the hierarchy to the responsible authoritative DNS server. This is illustrated in FIG. 2D, for example, where DNS requests are issued by multiple computers, e.g., computer 112 and computer (PC 3) 126 (via a separate router (router 3) 128 and ISP server (ISP 2) 130), and are all propagated up ultimately to authoritative DNS server 104 for issuing an invalid response to each individual DNS request.

As will become more apparent below, some embodiments consistent with the invention may address the aforementioned types of attacks at least in part through prefetching into a recursive DNS server one or more DNS entries from an authoritative DNS server for the purpose of building a whitelist in the recursive DNS server. Then, in response in response to a DNS request received by the recursive DNS server, the whitelist may be accessed to attempt to locate a matching DNS entry for the received DNS request, and in response to locating a matching DNS entry for the received DNS request, the matching DNS entry may be returned as a response to the DNS request.

In some embodiments, the herein-described functionality may be implemented within a DNS prefetch layer within a recursive or authoritative DNS server. FIG. 1, for example, illustrates a DNS prefetch layer implemented in a recursive additional DNS server 120, as well as a DNS prefetch layer 120' implemented in an ISP DNS server. As also illustrated in FIG. 1, however, DNS prefetch layers may also be present in other DNS servers, e.g., as implemented in a router or network device 110 or a computing device 112, 114, 116, 118. Also, while not shown in FIG. 1, a DNS prefetch layer may be implemented in some embodiments in root and/or authoritative DNS servers 102, 104.

Figure 3:
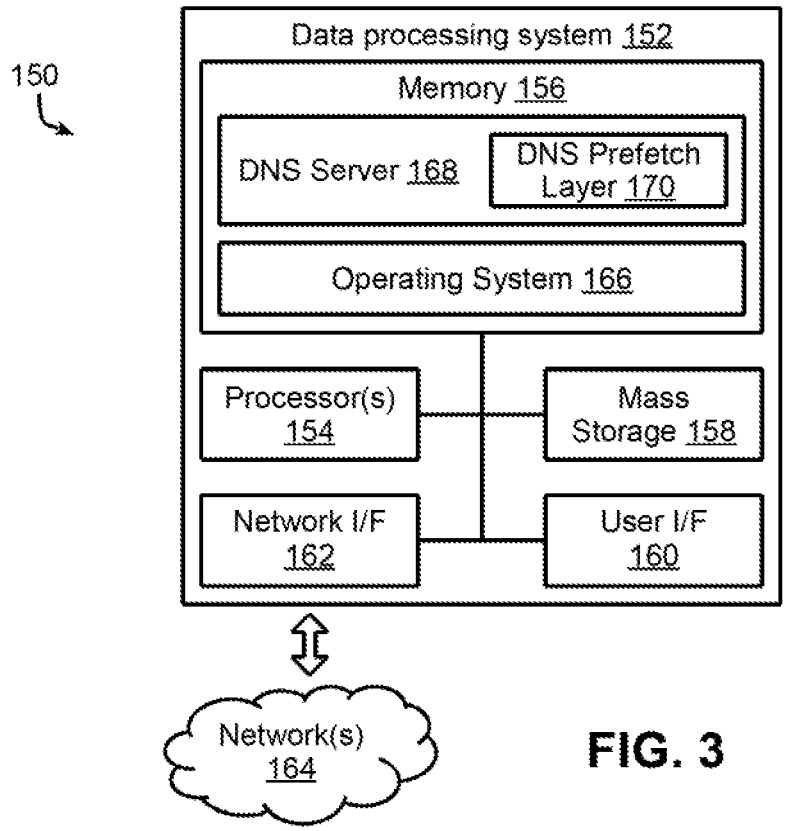
FIG. 3 is a block diagram of an example data processing system incorporating a DNS prefetch layer consistent with the invention.

Turning now to FIG. 3, this figure illustrates an example hardware and software environment 150 within which DNS prefetching may be implemented consistent with the invention. A data processing system 152, which may represent any of the components 102-118 illustrated in FIG. 1 (among others), may include one or more processors 154, each of which may be implemented as a single or multi-threaded processor and/or as a single or multi-core processor, as well as a memory 156, which may be considered to include one or more levels of memory devices, e.g., a DRAM-based main storage, as well as one or more levels of data, instruction and/or combination caches, with certain caches either serving individual processors or multiple processors as is well known in the art. In the illustrated embodiment, for example, memory 156 may include a volatile memory. In addition, the memory 156 of data processing system 152 may be considered to include memory storage physically located elsewhere in data processing system 152, e.g., any cache memory in a processor, as well as any storage capacity used as a virtual memory, e.g., as stored on a mass storage device or on another computer coupled to data processing system 152.

In addition, in the illustrated embodiment, data processing system 152 may include additional hardware components, e.g., one or more mass storage devices 158 (e.g., internal and/or external hard disk and/or solid state drives, a storage area network, network attached storage, etc.), a user interface 160 incorporating one or more user input/output devices (e.g., a keyboard, a pointing device, a display, a printer, etc.), and one or more network interfaces 162 interfacing the data processing system to one or more networks 164.

Data processing system 152 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to data processing system 152 via network, e.g., in a distributed or client-server computing environment, whereby the processing required to implement the functions of a computer program may be allocated to multiple computers over a network. Thus, for example, data processing system 152 may include a cluster or other networked combination of computers in some embodiments. For example, while the discussion may refer to an authoritative or recursive DNS server, it will be appreciated that such a server could be implanted by multiple server instances distributed across multiple physical machines.

For example, FIG. 3 illustrates an operating system 166 and a DNS server 168 incorporating a DNS prefetch layer 170 for implementing DNS prefetching in the manner described herein. Additional software components may also be resident in data processing system 152, and it will be appreciated that virtualization may be used in some embodiments, and that a DNS server may be implemented in a cloud computing environment in some embodiments. It will also be appreciated that the invention described herein may be a system, a method, and/or a computer program product in various embodiments. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIG. 3 is not intended to limit the invention. Indeed, those skilled in the art will recognize that other alternative hardware and/or software environments may be used without departing from the scope of the invention.

Figure 4:
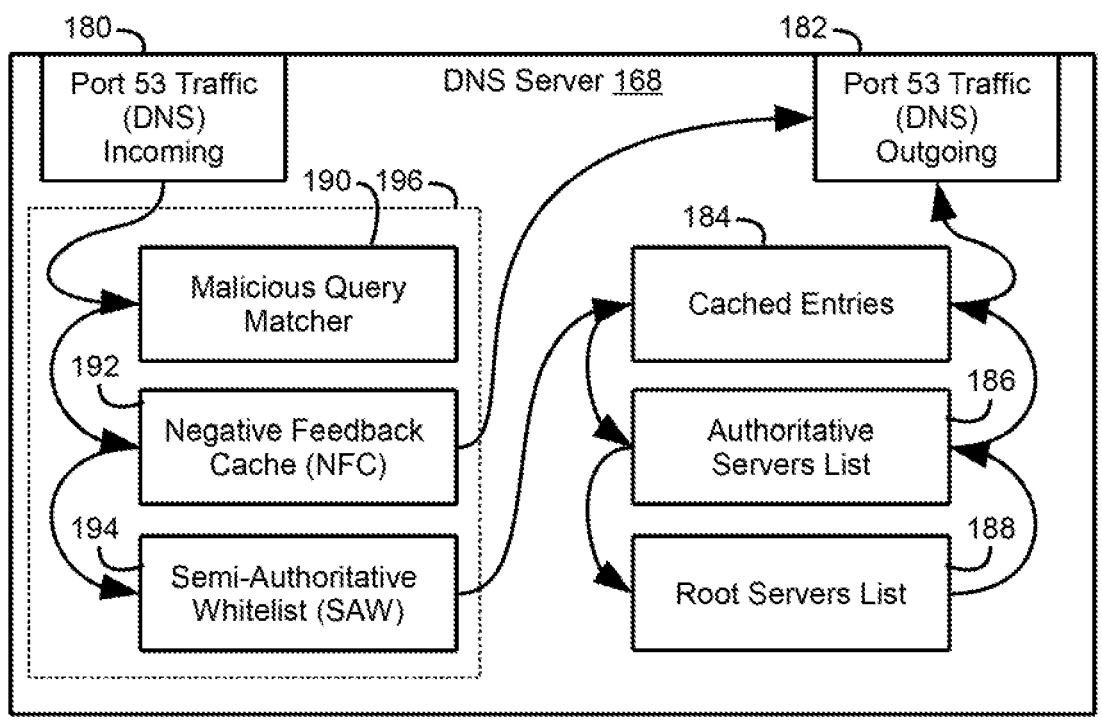
FIG. 4 is a block diagram illustrating various components in the DNS server referenced in FIG. 3.

Now turning to FIG. 4, this figure illustrates components within an example implementation of DNS server 168 of FIG. 3. Similar to a conventional DNS server, DNS server 168 may include incoming and outgoing ports 180, 182, which may be assigned to Internet socket port number 53, which is generally designated for DNS traffic. In addition, DNS server 168 may include a set of cached DNS entries 184, along with a list of authoritative servers 186 and a list of root servers 188. In the absence of DNS prefetching in the manner disclosed herein, DNS requests are generally handled by first determining if a requested DNS entry is cached (i.e., is in set 184), and if so, returning the cached DNS entry. If the requested DNS entry is not cached in the DNS server, it is determined whether the authoritative server for the domain specified in the DNS request is known (i.e., is in list 186), and if so, querying the authoritative server to retrieve either the requested DNS entry or an indication that a DNS entry does not exist (i.e., an invalid DNS request). If the authoritative server is not known, the authoritative server may be looked up by querying the appropriate top level domain root server in list 188, and then querying the authoritative server identified in the response. Further, whenever a DNS entry is returned from the authoritative server, the DNS entry may be cached along with returned as the result of the DNS request.

In addition to the aforementioned components, DNS server 168 additionally includes a malicious query matcher 190, negative feedback cache (NFC) 192 and semi-authoritative whitelist (SAW) 194, which together implement a DNS prefetch layer 196. In this embodiment, the DNS prefetch layer implements both negative feedback caching and semi-authoritative whitelisting in connection with DNS prefetching. It should also be noted that while prefetching of DNS entries is generally supported by end-user clients, e.g., to prefetch DNS entries for external content linked-to by a retrieved web page, prefetching of DNS entries in a recursive DNS server, as is disclosed herein, is fundamentally different because a DNS server generally has no ability to predict what future domain requests might come into its system from its clients.

Negative feedback caching, e.g., as implemented by negative feedback cache 192, caches negative responses returned from a higher order DNS server, e.g., invalid DNS requests associated with DNS requests for which no DNS entries could be retrieved. As such, subsequent queries to the negative feedback cache that match entries in the cache may be used to immediately return invalid DNS responses, rather than issuing recursive DNS requests to higher order DNS servers.

As will be discussed in greater detail below, negative feedback caching in some embodiments is implemented selectively, since cached negative feedback associated with a requested DNS entry could preclude later retrieval of a valid DNS entry after a temporary outage or after a network resource (e.g., a new sub-domain for a domain) was later added. Cached responses may also be considered to be failed DNS requests or queries, and it will be appreciated that the information that is actually cached may vary in different embodiments, so long as a determination may be made as to whether or not a subsequent DNS request directed to the same address or sub-domain is associated with negative feedback, i.e., that a prior DNS request has resulted in a failure to retrieve an associated DNS entry. For example, in one embodiment discussed hereinafter, a cache may store nothing more than a hash value associated with an address or sub-domain for which an invalid query response has been returned.

In one embodiment, failed DNS requests or queries may be cached and assigned timeouts, allowing duplicate DNS requests to quickly addressed without issuing further recursive DNS requests, but also enabling the failed DNS queries to be automatically discarded after some period of time. As noted above, should a website begin offering network resources at a previously invalid address or sub-domain, or should a temporary outage exist at the time a DNS query failed, a risk exists that a cached failed DNS query would preclude later access to a valid address or sub-domain. Thus, enabling failed DNS queries to be removed from the negative feedback cache after some period of time may reduce the likelihood of precluding that later access. In addition, in some embodiments, rather than automatically discarding a cached failed DNS query based upon a timeout, the timeout may be used to trigger a DNS server query to an authoritative server to confirm that the cached failed DNS query is still valid (i.e., that the failed DNS query is still not associated with a valid DNS entry). Further, in some embodiments, rather than checking on individual cached failed DNS queries, a DNS server may periodically check each cached failed DNS query by accessing the authoritative DNS server. It will be appreciated that any such confirmation queries to an authoritative DNS server may also be restricted to times where the load on the DNS server or the authoritative DNS server is sufficiently low.

As such, negative feedback caching effectively prefetches failure for users, thereby improving performance in the case of commonly mistaken domains or DDoS attacks that eventually converge through a handful of DNS providers. In some embodiments, it may also be desirable to activate negative feedback caching selectively in different levels of a DNS server, e.g., such that as a DDoS attack increases in volume, the optimization is first activated at the T1 infrastructure providers, and then if the load is very large from many distributed points, the same optimization is made at the ISP level to stop the heavy (but still lighter than the authoritative or infrastructure) load. In some embodiments, the optimization may even reach the consumer device level and help head off DNS based attacks from hijacked equipment a consumer may not realize has been compromised.

Semi-authoritative whitelisting, e.g., as implemented by semi-authoritative whitelist 194, enables a non-authoritative DNS server such as a recursive DNS server to act more authoritative under load that would otherwise cripple it or its upstream provider, e.g., in the event of a DDoS attack. As such, "semi-authoritative" is used to refer to the fact that a whitelist includes DNS entries retrieved from an authoritative DNS server, but for which there is no guarantee that the whitelist is current or otherwise synchronized with the authoritative list of DNS entries managed by the authoritative DNS server. From the perspective of a requester, however, a DNS server implementing semi-authoritative whitelisting temporarily acts as an semi-authoritative source for the DNS request, and thus is authoritative in nature without being officially designated as such.

In some embodiments, for example, rather than process crippling levels of queries that would otherwise need to be relayed on to higher order DNS servers, a DNS server incorporating semi-authoritative whitelisting may instead begin to act as a semi-authoritative source for those queries until such time as load lightens. To do so, DNS prefetching may be performed to retrieve a set or list of valid DNS entries for one or more domains such that the retrieved set can be used to handle DNS requests. Thus, for example, if a DNS server is serving ibm.com, when semi-authoritative whitelisting is used, rather than only fetching sub-domains when they're requested the first time, a DNS server may maintain a list of all current sub-domains and their addresses for ibm.com so that a recursive DNS request need not be issued. As will become more apparent below, this prefetching may allow a DNS server to be more authoritative for a short period of time.

It will be appreciated that a prefetch of all DNS entries for a domain can be rather large in size and is somewhat inconsistent with DNS principles whereby fetching is generally performed as needed and all other queries are referred. However, it is believed that in some circumstances, e.g., during DDoS attacks, offering stale data can be more helpful than offering no data at all, especially given the relatively low rate of churn and the fairly slow DNS propagation for new DNS entries. Given, however, that fetching all current DNS entries for a domain is relatively expensive, and that the fetched DNS entries may need to be re-validated over time to prevent a DNS server from becoming an unintentional malicious actor due to the retention of stale data, it may be desirable in some embodiments to implement whitelisting, and utilizing a malicious query matching filter such as a bloom filter to handle DNS requests.

A bloom filter, for example, may be built in some embodiments based on all prefetched DNS entries, and optionally including just the names, and not even what the names resolve to. Incoming DNS requests may then be processed through this bloom filter. Bloom filters, as well as other similar probabilistic filters suitable for use in matching malicious queries, e.g., Cuckoos filter, quotient filters. etc., may provide a relatively quick lookup, as they offer two responses to a check to see if they contain data; "possibly" or "not at all." Such filters are useful for whitelists as they generally don't generate false negatives, and the generation of a few false positives is an acceptable tradeoff for the performance gains in many embodiments.

Further, as will also be appreciated from the discussion below, malicious query matcher 190 may be used to attempt to direct DNS requests the cached negative feedback instead of forwarding those requests using a recursive DNS approach. While other implementations may be used in other embodiments, in one embodiment malicious query matcher 190 implements a bloom filter or similar matching logic.

Figure 5:
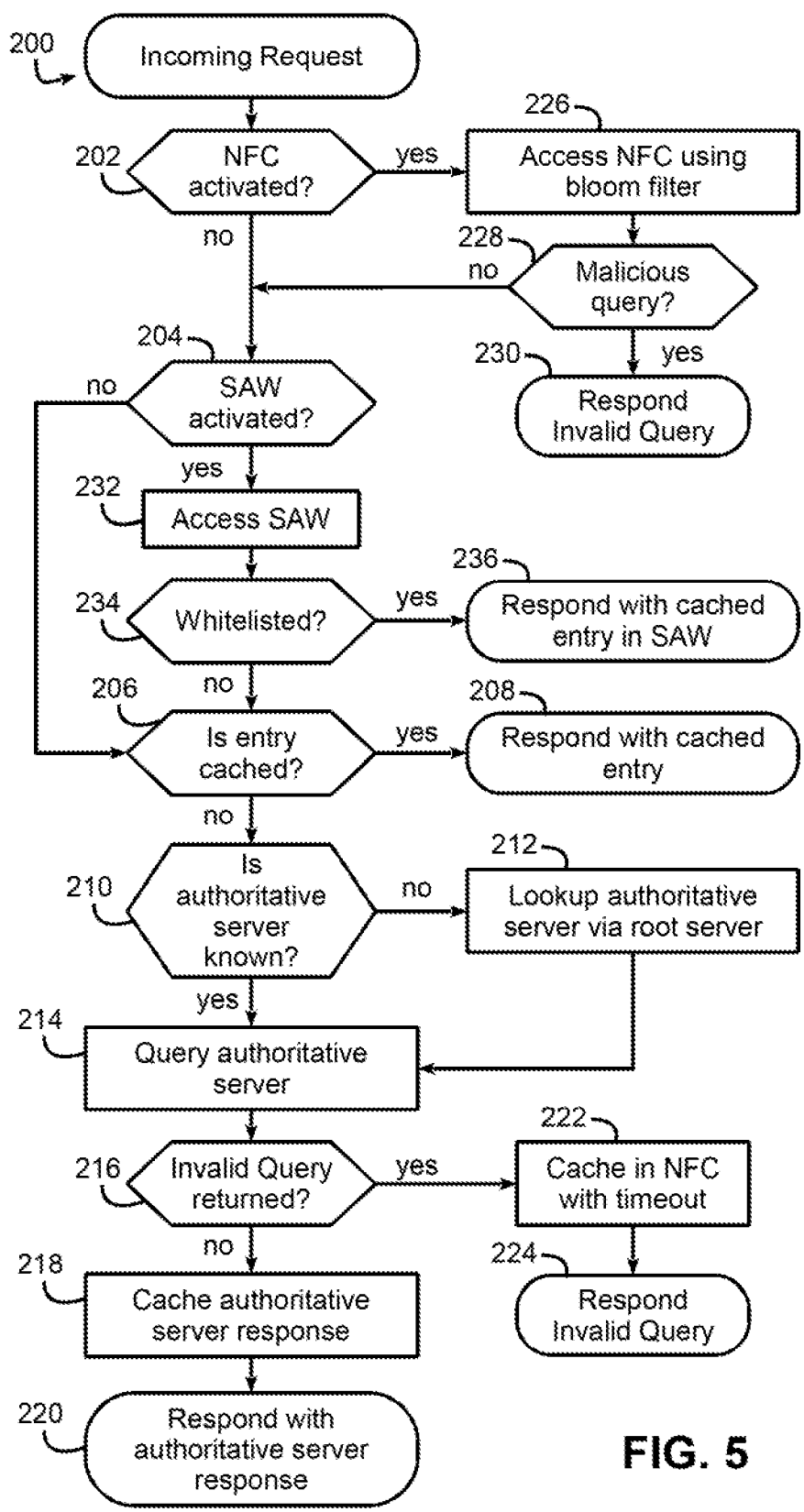
FIG. 5 is a flowchart illustrating an example sequence of operations for handling a DNS request in the data processing system of FIG. 3.

Now turning to FIG. 5, this figure illustrates an example request handling routine 200 implementing a sequence of operations that may be implemented in a DNS server, e.g., DNS server 180 of FIGS. 3-4, consistent with some embodiments of the invention. Routine 200 is initiated in response to receipt of a DNS request, and relies on negative feedback caching and semi-authoritative whitelisting functions that are selectively activated in response to load (e.g., load of the DNS server and/or of an authoritative DNS server accessed thereby). First, assuming that neither negative feedback caching nor semi-authoritative whitelisting is active, blocks 202 and 204 of routine 200 will pass control to block 206 to handle the DNS request in a similar manner to standard DNS request handling, by first determining whether the DNS entry corresponding to the DNS request is cached in the DNS server. If so, control passes to block 208 to respond to the DNS request with the cached DNS entry.

If not, however, control passes to block 210 to determine if the authoritative server for the requested DNS entry is known. If not, control passes to block 212 to lookup the authoritative server from the root server, and then to block 214 to query the authoritative server for the DNS entry. Returning to block 210, if the authoritative server is known, block 212 is bypassed and control passes directly to block 214.

Block 216 next determines if an "invalid query" response has been returned, indicating that no matching DNS entry was found. If not, and a valid DNS query was returned, control passes to block 218 to cache the DNS entry returned by the authoritative server, and then to block 220 to respond to the DNS request with the DNS entry returned by the authoritative server.

Returning to block 216, if an "invalid query" response is returned, control passes to block 222 to cache this response in the negative feedback cache, and optionally including a timeout (e.g., a timestamp of the response, a timestamp for a trigger, or a duration for a trigger) to be associated with the response. Control then passes to block 224 to respond to the DNS request with an "invalid query" response. Thus, in this embodiment invalid query responses are cached in the negative feedback cache even when negative feedback caching is not activated.

Now returning to block 202, if negative feedback caching is activated, control passes to block 226 to access the negative feedback cache with the malicious query matcher, e.g., using a bloom filter, and to determine in block 228 whether the query is potentially malicious based upon cached negative feedback.

As noted above, the negative feedback cache may be used in some embodiments to reject DNS queries for addresses that are known to not exist, so that identical repeated requests generally require one lookup to be performed for one of the requests, so the other requests can be immediately rejected without lookup from another DNS server. A negative feedback cache may therefore store a list of confirmed invalid DNS queries or addresses. It will also be appreciated that various data structures may be used to maintain such a cache, e.g., a list, array, set, etc.

A bloom filter, or another similar type of filter, may also be used to accelerate accesses to the negative feedback cache in some embodiments. String comparisons are in general slow, and may require character by character checking, such that checking if bad.ibm.com and good.ibm.com are the same site may require a number of comparisons, as DNS requests are generally evaluated back to front and a comparison would generally first compare "com" and "ibm" before detecting the difference between "bad" and "good." Thus, rather than doing this type of comparison for every item in the negative feedback cache, addresses may instead be hashed in some embodiments such that comparisons are substantially simplified, e.g., com.ibm.good might hash to 247 and com.ibm.bad might hash to 249, and such that comparing these addresses would be a single operation. In addition, by just storing the hash numbers for bad/invalid entries in the negative feedback cache, the cache may be substantially smaller than if entire addresses were stored.

Thus, if block 228 determines that the query is malicious or otherwise invalid, control passes to block 230 to respond with an "invalid query" response. Consequently, in this scenario the DNS request has been determined to be invalid without having to issue a recursive DNS request to a higher order DNS server. Otherwise, control passes to block 204, as the DNS request cannot be confirmed to be invalid from negative feedback caching.

Block 204 determines if semi-authoritative whitelisting is activated, and if so, the semi-authoritative whitelist is accessed in block 232 and based on this access block 234 determines if the requested DNS entry is in the semi-authoritative whitelist. If so, control passes to block 236 to respond with the cached DNS entry in the semi-authoritative whitelist. Otherwise, control passes to block 206 to handle the DNS request in the manner described above.

Figure 6:
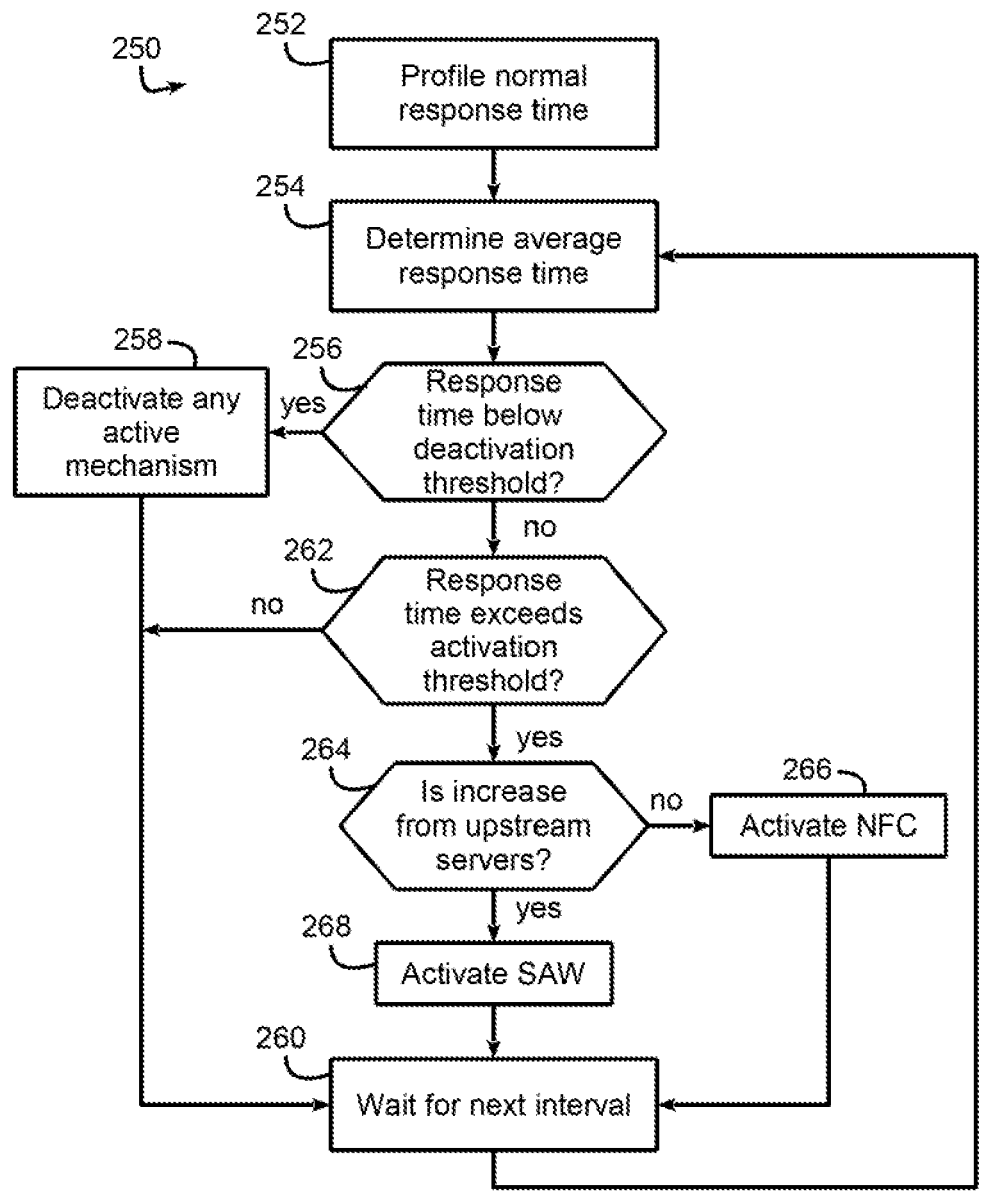
FIG. 6 is a flowchart illustrating an example sequence of operations for controlling the activation and deactivation of negative feedback caching and semi-authoritative whitelisting in the data processing system of FIG. 3.

As noted above, both negative feedback caching and semi-authoritative whitelisting are activated selectively, e.g., where the load of the DNS server or of another DNS server in communication therewith exceeds a threshold, also referred to as system load. FIG. 6, for example, illustrates at 250 an example sequence of operations for selectively activating or deactivating these functions based on system load where the system load is based upon response times, although it will be appreciated that other metrics for system load may be used in other embodiments, whether based on response times, numbers of requests processed or received, etc. Furthermore, load may be based upon the local activities of a DNS server, the activities of other DNS servers (e.g., an authoritative DNS server, one or more other recursive DNS servers, etc.), or some combination thereof.

Thus, for sequence of operations 250, block 252 first performs profiling to determine what a "normal" response time is, e.g., how long the DNS server takes to respond to a typical DNS request. Response times may be based on the local DNS server or may be associated with particular DNS servers in some embodiments (e.g., particular authoritative DNS servers), or alternatively may be associated with multiple DNS servers, and profiling may be based on tracking response times over a period of time during which normal load conditions are known to exist.

After a normal response time has been determined, control passes to block 254 to initiate a periodic loop to monitor response times during the operation of the DNS server. Block 254 in particular determines a current average response time, e.g., by tracking response times over a window. Block 256 then determines whether the response time is below a deactivation threshold (i.e., when a high system load condition has been discontinued), and if so, passes control to block 258 to deactivate any active mechanism (e.g., negative feedback caching or semi-authoritative whitelisting). Control then passes to block 260 to wait for the next monitoring interval, at which time control returns to block 254 to once again check the current average response time.

Returning to block 256, if the average response time is not below the deactivation threshold, control passes to block 262 to determine if the average response time exceeds an activation threshold, indicating that the load has increased beyond a "normal" level of load and that a high system load condition exists. If not, control passes to block 260 to wait for the next monitoring interval. If so, however, control passes to block 264 to determine if the increase if from "upstream" DNS servers, i.e., higher order DNS servers such as other recursive DNS servers or an authoritative DNS server. If the increase is not from upstream servers, control passes to block 266 to activate negative feedback caching, while if the increase is from upstream servers, control passes to block 268 to active semi-authoritative whitelisting. Upon activation of either function, control then passes to block 260 to wait for the next monitor interval.

It will be appreciated that in various embodiments negative feedback caching and semi-authoritative whitelisting may be separately and/or jointly activated and/or deactivated based upon load levels and/or potential sources of increased load, and that various thresholds may be used to activate or deactivate these functions. Further, the manner in which load is measured may vary in different embodiments, so the invention is not limited to the particular implementations discussed herein.

Figure 7:
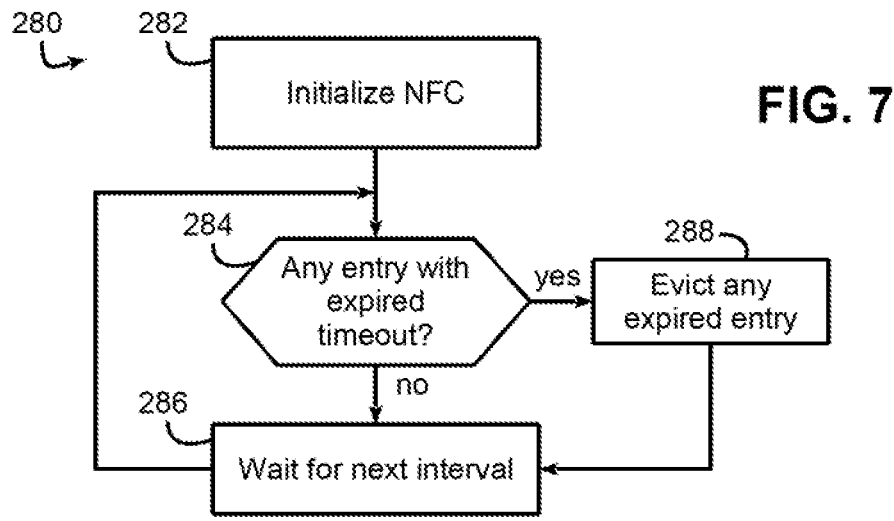
FIG. 7 is a flowchart illustrating an example sequence of operations for managing a negative feedback cache in the data processing system of FIG. 3.

FIG. 7 next illustrates at 280 an example sequence of operations for managing a negative feedback cache, and which may be called, for example, during initialization of a DNS server. First, at block 282 the negative feedback cache is initialized, e.g., by initializing storage and/or a data structure for the cache. Block 284 then determines whether any entry in the cache has an expired timeout (i.e., is associated with a stale failed DNS request), and if not, passes control to block 286 to wait for a next eviction interval, at which point control returns to block 284. Thus, sequence of operations 280 periodically checks the cache for expired entries.

Returning to block 284, if any expired entries are detected, control passes to block 288 to evict the expired entry from the cache. Control then passes to block 288 to wait for a next interval. As noted above, in some embodiments a timeout may be used to trigger an access to an authoritative DNS server to verify whether the entry is still invalid, whereby block 288 may access an authoritative DNS server prior to deciding to evict an entry from the cache.

Figure 8:
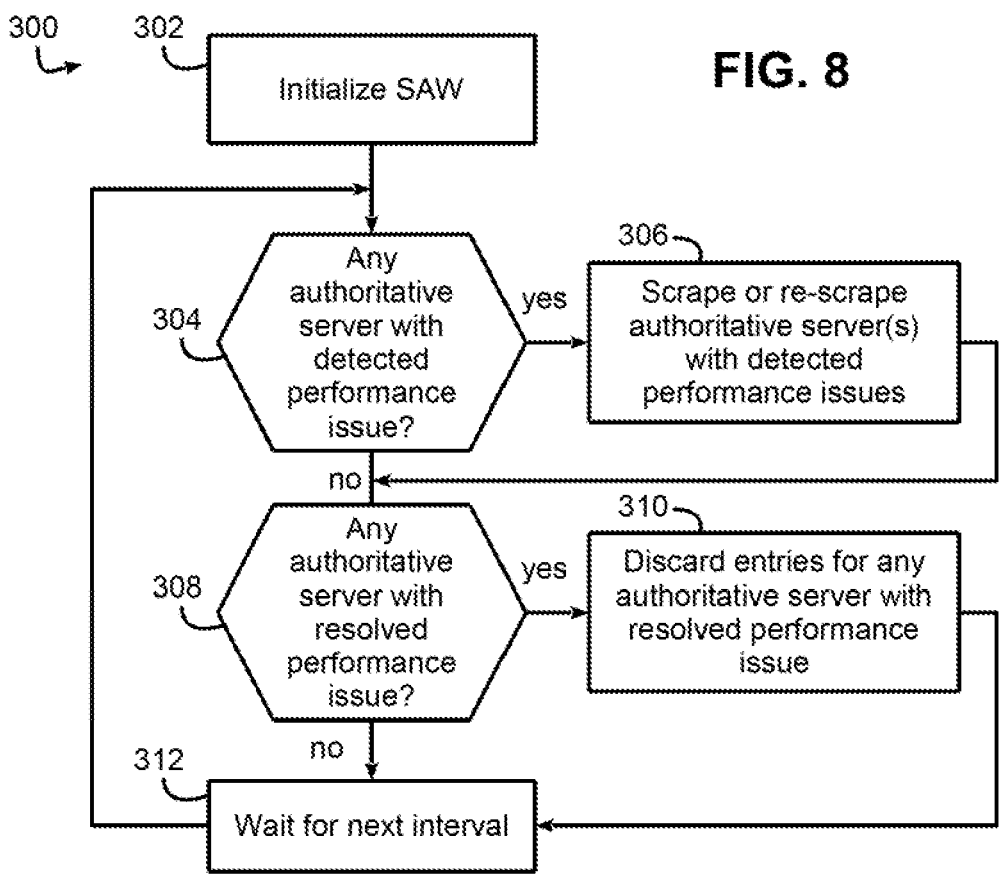
FIG. 8 is a flowchart illustrating an example sequence of operations for managing a semi-authoritative whitelist in the data processing system of FIG. 3.

FIG. 8 next illustrates at 300 an example sequence of operations for managing a semi-authoritative whitelist, and which may also be called, for example, during initialization of a DNS server. First, at block 302 the semi-authoritative whitelist is initialized, e.g., by initializing storage and/or a data structure for the whitelist. Block 304 then determines whether any authoritative DNS server has been detected as having a potential performance issue. For example, response times from authoritative DNS servers may be monitored in some embodiments such that increases in response times may indicate potential performance issues. Alternatively, performance issues could be based upon notifications received by a DNS server, e.g., within responses to DNS queries or via sideband messages, whether provided by a loaded authoritative DNS server or another component in a DNS service.

If a performance issue is detected in an authoritative DNS server, control passes to block 306 to scrape the authoritative DNS server(s) in question, e.g., by prefetching the valid DNS entries from the authoritative DNS server(s). Thus, prefetching may be performed in some embodiments at the onset of potential performance issues. In other embodiments, however, prefetching may be performed independently of any performance issues. Further, in some embodiments re-scraping may be performed, e.g., to update a semi-authoritative whitelist that has previously been generated. In such instances, prefetching may only be performed for DNS entries that have changed since the last prefetch was performed.

Upon completion of block 306, or if no server with performance issues is detected in block 304, control passes to block 308 to determine if any authoritative DNS server has resolved performance issues, e.g., where response times have returned to normal or where an appropriate notification has been received. If so, control passes to block 310 to discard any DNS entries for any authoritative DNS server for which performance issues have been resolved. Upon completion of block 310, or if block 308 does not detect any resolved performance issues, control passes to block 312 to wait for a next interval. Thus, sequence of operations 300 periodically checks for the need to prefetch and/or discard DNS entries from authoritative DNS servers based upon performance issues associated therewith. Other manners of controlling when prefetching occurs and/or when prefetched DNS entries are discarded may be used in other embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
   at least one processor; and
   program code configured upon execution by the at least one processor to handle Domain Name Service (DNS) requests by:
      prefetching from an authoritative DNS server DNS entries for one or more domains to build a whitelist of DNS entries in a recursive DNS server, wherein the prefetched DNS entries map domain names to addresses; and
      in response to a DNS request received by the recursive DNS server:
         accessing the whitelist to attempt to locate a matching DNS entry for the received DNS request; and
         in response to locating a matching DNS entry for the received DNS request, returning the matching DNS entry as a response to the DNS request rather than forwarding the DNS request to a different DNS server;
   wherein the program code is further configured to monitor system load, and to access the whitelist selectively in response to the monitored system load, and wherein the program code is configured to access the whitelist selectively by:
      activating a mode in response to determining a high system load from the monitored system load, wherein the program code accesses the whitelist only when the mode is activated when the DNS request is received by the recursive DNS server; and
      after activating the mode, selectively deactivating the mode in response to determining a discontinuation of the high system load from the monitored system load.

2. The apparatus of claim 1, wherein the whitelist is a semi-authoritative whitelist.

3. The apparatus of claim 1, wherein the program code is configured to monitor system load by monitoring system load in the recursive DNS server.

4. The apparatus of claim 1, wherein the program code is configured to monitor system load by monitoring response time for the authoritative DNS server.

5. The apparatus of claim 1, wherein the program code is further configured to:
   cache failed DNS requests in a negative feedback cache; and
   in response to the DNS request received by the recursive DNS server, access the negative feedback cache and return an invalid DNS response in response to the DNS request received by the recursive DNS server matching a failed DNS request cached in the negative feedback cache.

6. The apparatus of claim 5, wherein the program code is configured to access the whitelist in response to the DNS request received by the recursive DNS server not matching any failed DNS request cached in the negative feedback cache.

7. The apparatus of claim 5, wherein the program code is further configured to remove stale failed DNS requests from the negative feedback cache.

8. The apparatus of claim 7, wherein the program code is configured to cache the failed DNS requests by associating each failed DNS request with a timeout, and wherein the program code is configured to remove stale failed DNS requests by removing failed DNS requests for which the associated timeout has been triggered.

9. The apparatus of claim 5, wherein the program code is further configured to:
   in response to not locating the matching DNS entry for the received DNS request, forward the DNS request received by the recursive DNS server to a different DNS server; and
   in response to receiving an invalid response to the forwarded DNS request from the different DNS server, cache the DNS request received by the recursive DNS server in the negative feedback cache as a failed DNS request.

10. The apparatus of claim 5, wherein the program code is further configured to:
    activate a mode in response to determining a high system load, wherein the program code is configured to access the negative feedback cache only when the mode is activated when the DNS request is received by the recursive DNS server; and
    after activating the mode, selectively deactivate the mode in response to determining a discontinuation of the high system load from the monitored system load.

11. The apparatus of claim 5, wherein the program code is further configured to apply a malicious query matching filter to the DNS request received by the recursive DNS server, and return an invalid DNS response to the DNS request received by the recursive DNS server in response to a match with the malicious query matching filter.

12. The apparatus of claim 11, wherein the malicious query matching filter includes a bloom filter.

13. The apparatus of claim 1, wherein the program code is configured to prefetch from the authoritative DNS server the DNS entries for the one or more domains by prefetching from the authoritative DNS server each sub-domain for the one or more domains.

14. The apparatus of claim 13, wherein the program code is further configured to update the whitelist over time by repeating prefetching from the authoritative DNS server.

15. The apparatus of claim 1, wherein the recursive DNS server is resident in a root DNS data processing system, an Internet Service Provider (ISP) data processing system, a network router data processing system or a client data processing system.

16. A program product, comprising:
 a non-transitory computer readable medium; and
 program code stored on the non-transitory computer readable medium and configured upon execution by at least one processor to handle Domain Name Service (DNS) requests by:
  prefetching from an authoritative DNS server DNS entries for one or more domains to build a whitelist of DNS entries in a recursive DNS server, wherein the prefetched DNS entries map domain names to addresses; and
  in response to a DNS request received by the recursive DNS server:
   accessing the whitelist to attempt to locate a matching DNS entry for the received DNS request; and
   in response to locating a matching DNS entry for the received DNS request, returning the matching DNS entry as a response to the DNS request rather than forwarding the DNS request to a different DNS server;
 wherein the program code is further configured to monitor system load, and to access the whitelist selectively in response to the monitored system load, and wherein the program code is configured to access the whitelist selectively by:
  activating a mode in response to determining a high system load from the monitored system load, wherein the program code accesses the whitelist only when the mode is activated when the DNS request is received by the recursive DNS server; and
  after activating the mode, selectively deactivating the mode in response to determining a discontinuation of the high system load from the monitored system load.

* * * * *